US008799052B2

(12) United States Patent
Beyer et al.

(10) Patent No.: US 8,799,052 B2
(45) Date of Patent: Aug. 5, 2014

(54) METHOD AND SYSTEM FOR DETERMINISTIC SAMPLING WITH A SPECIFIC DISTRIBUTION

(75) Inventors: Dirk M. Beyer, Mountain View, CA (US); Cipriano A. Santos, Mountain View, CA (US); Bilal Iqbal, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2827 days.

(21) Appl. No.: 09/853,961

(22) Filed: May 10, 2001

(65) Prior Publication Data

US 2002/0178052 A1 Nov. 28, 2002

(51) Int. Cl.
*G06Q 30/02* (2012.01)

(52) U.S. Cl.
USPC ... 705/7.29; 705/14.4; 705/14.49; 705/14.66; 705/14.73

(58) Field of Classification Search
CPC .............. G06Q 30/02; G06Q 30/0241; G06Q 30/0251; G06Q 30/0201; G06Q 30/0269
USPC .......... 705/14, 7.11, 14.4, 14.49, 7.29, 14.66, 705/14.73
See application file for complete search history.

(56) References Cited

U.S. PATENT DOCUMENTS

| | | | | |
|---|---|---|---|---|
| 6,286,005 | B1 * | 9/2001 | Cannon | 707/100 |
| 7,707,091 | B1 * | 4/2010 | Kauffman et al. | 705/36 R |
| 2002/0178052 | A1 * | 11/2002 | Beyer et al. | 705/14 |

OTHER PUBLICATIONS

Definition of "amount" (noun), downloaded from Merriam-Webster's Online Dictionary, at http://www.search.eb.com/dictionary on Mar. 6, 2005.*

* cited by examiner

*Primary Examiner* — Donald L. Champagne

(57) ABSTRACT

A method and system for selection of a task in proportion to a desired distribution. Specifically, in one embodiment, the present invention discloses a method and system for selecting a task associated with a visiting customer to a web site over a communication network. The customer is assigned to a segment of a target customer base that most closely resembles the customer's characteristics. A plurality of tasks is associated with the segment and can be expressed as a distribution of tasks performed. A current distribution of tasks is determined. The task which provides a new distribution that is closest to a desired distribution of the plurality of tasks is selected to be performed. In one embodiment, the task to be performed is the offering of an advertising promotion to the customer over the communication network.

22 Claims, 10 Drawing Sheets

600
Start
610 Select a Task for the Segment
620 Assume That Task Will Be Performed
630 Create a Theoretical Distribution Vector Assuming That Task Was Performed
640 Calculate the Vector Norm of the Difference Between the Theoretical Distribution Vector and an Optimal Distribution Vector
650 Store the Vector Norm Associated with the Task Assumed to be Performed in Memory as Part of a Plurality of Vector Norms
660 Are There Any Other Tasks That Have Not Been Selected?
Yes
No
670 Select the Vector Norm in the Plurality of Vector Norms with the Least Value
680 Perform the Task Associated with the Vector Norm with the Least Value
End

| | Promotion 1 | Promotion 2 | Promotion 3 |
|---|---|---|---|
| Segment A | 30% | 20% | 50% |
| Segment B | 31% | 27% | 52% |
| Segment C | 25.3% | 33.4% | 41.3% |

$$\sum_i |r_i|$$

Fig. 7A $$\sqrt{\sum_i r_i^2}$$

Fig. 7B $$\left( \sum |r_i|^P \right)^{1/P}, \quad P \geq 1$$

Fig. 7C $$\max_i (|r_i^2|)$$

Fig. 7D

METHOD AND SYSTEM FOR DETERMINISTIC SAMPLING WITH A SPECIFIC DISTRIBUTION

BACKGROUND OF THE INVENTION

1. Field of the Invention

The present invention relates to the field of task selection. More specifically, the present invention relates to the on-line selection of tasks such that a desired distribution of these tasks is followed.

2. Related Art

An information record typically contains a multiplicity of variables (or attributes and/or fields), with information preferably provided for each variable in the record. Based on the information in the record, the record can be classified (segmented) into one or more of a number of different categories.

For example, the variables in a customer record might include the customer's level of education, income, address, hobbies and interests, and recent purchases. The customer is commonly requested to provide this type of information on product registration cards or warranty cards provided to the customer when he or she purchases a product. Additionally, this type of information is also frequently requested from customers when they shop on-line (e.g., over the Internet). Certain information can also be obtained from the customer's computer upon connecting to a web site over the Internet. Further, marketing surveys are also performed in order to deliberately gather such information.

A large amount of information and data is generated using these approaches, given the large number of responses, the long list of requested information, and the diversity of the responses. To bring order to the data, classification tools are used to categorize (or classify or segment) each customer record based on the information it contains. In this way a company's customer base can be further categorized into various segments. Each of the segments are associated with an independent set of characteristics or rules that generally describe the customers, old or new, that fall within the segment. For example, a shoe company may segment their customers using various characteristics (e.g., shoe size, age of customer, sex of customer, activities participated by the customer, income of the customer, how much does the customer spend on a regular basis, how has the customer reacted to promotions in the past, etc.).

In one instance, once a company decides on how to segment their customer base, an advertising campaign can be tailored to take advantage of the segmented information. In the simplest terms, an advertising campaign may have numerous advertising promotions that can be offered to customers of a particular segment. An advertising campaign can be expanded to include numerous segments, each of which are targeted with advertising promotions. Advertising promotions for one segment may be the same, different, similar as the advertising promotions offered to other segments. Additionally, an advertising promotion may include an offer for sale of a product, a coupon for a product, a rebate on a product, etc.

Depending on a campaign's objective, an optimized distribution of the advertising promotions is created for each segment of the customer base. This distribution describes a desired distribution of all the advertising promotions offered to customers in a particular segment. The desired distribution is designed to achieve a particular objective (e.g., maximizing profit, generating revenue, reducing inventory, gaining new customers, etc.).

Implementation of the advertising campaign can occur through various mediums. One traditional medium is through the mail. For example, promotions could be distributed to the various customers in a segment by mailing flyers, coupons, rebates, etc. A new medium is the Internet, or any other suitable communication network. One benefit to using the Internet for implementing an advertising campaign is quicker exposure and turn-around time. For example, a customer to a web site can be immediately presented with an advertising promotion. Moreover, the customer can immediately react to the promotion by instantly purchasing the promoted item.

Whatever the medium used to implement the advertising campaign, in order to fully achieve the objectives of the campaign, the actual distribution of advertising campaigns must be as close as possible to the desired distribution as designed. Ideally, this mirrored distribution must occur at any point in time during the advertising campaign.

However, previous methods for implementing a desired distribution do not adequately distribute an advertising campaign in an Internet environment. Although these previous methods are adequate in a mailing environment, these methods do not adequately distribute advertising promotions to match desired distributions where the amount of customers arriving at a web site and the frequency of customers arriving are not well known.

FIG. 1 illustrates an generalized advertising campaign that may be implemented in the prior art. FIG. 1 shows a matrix table 100 of a simplified advertising campaign. The campaign is targeted towards two segments of customers, segment-A 110 and segment-B 120. Advertising promotions are offered to each segment in varying proportions. In this case, each of the advertising promotions are offered to both segments 110 and 120.

The promotions offered to the segments are promotion-1 132, promotion-2 134, and promotion-3 136. In an advertising campaign tailored towards selling shoes, promotion-1 132 could be an offer for black running shoes, for example. Likewise, promotion-2 134 could be an offer for white basketball shoes. Also, promotion-3 136 could be an offer for black basketball shoes.

For each segment, an optimized distribution was created. Looking at the row for segment-A 110, the distribution of promotions was optimized such that thirty percent of all offers for promotions made to the customers of segment-A 110 would be for promotion-1 132. Likewise, twenty percent of all offers for promotions made to the customers of segment-A 110 would be for promotion-2 134. Also, fifty percent of all offers for promotions made for customers of segment-A 110 would be for promotion-3 136.

Previously, various methods for implementing the advertising promotions included random allocation, naive round robin, and general round robin. However, each of these methods are inadequate in an environment where the number of customers are unknown and where the frequency of the customers are unknown. This is especially the case when an advertising campaign is implemented over a communication network, such as the Internet.

In the case of random allocation, pseudo random numbers are utilized to achieve the desired or desired distribution. In the above example, advertising promotions for a particular customer are picked from the list of all advertising promotions with a probability equal to the proportion required. For example, for a customer in segment-A 110, there would be a thirty percent chance that the customer would receive promotion-1 132, a twenty percent chance for promotion-2 134, and a fifty percent chance for receiving promotion-3 136. However, since random allocation is a random scheme, there is a chance that realized or actual proportions are far off from the required ones, especially when the sample size of customers is small.

In the case of naive and generalized round robin, a period is chosen. Calculations are then made-to determine how many repetitions of each advertising promotion is necessary per period such that the distribution of advertising promotions made within the period match the desired distribution. This period is then repeated continuously until the advertising campaign is completed. For example, in segment-A, picking a period of ten, promotion-1 132 must be offered three times, promotion-2 134 must be offered twice, and promotion-3 136 must be offered five times.

In the case of naive round robin, for every period, the advertising promotions that are offered and their repetitions are performed in sequence. For example, for segment-A 110, for a period of ten customers being made offers, the sequence would be as follows: 1112233333, or promotion-1 132 three times, then promotion-2 134 twice, and then promotion-3 136 five times. This sequence is repeated continuously until the completion of the advertising campaign.

General round-robin is similar to the naive round-robin. However, the order in which the advertising promotions are offered within a period are changed to more closely resemble the desired distribution at points within the period. For example, for segment-A 110, for a period of ten customers being made offers, the sequence could be as follows: 1233123313, or promotion-1, promotion-2, promotion-3 twice, promotion-1, promotion-2, promotion-3 twice, promotion-1, and promotion-3.

While easy to compute, the round-robin approach, naive or general, has the disadvantage that especially for small samples, the desired distribution and the actual distribution can be quite different. This is especially the case when an advertising campaign ends before the completion of period.

Furthermore, for general proportions, the period length required to achieve the desired distribution might be substantial. For example, in segment-B 120, the lowest value for a period that exactly achieves the desired distribution is one-hundred samples, since the distribution is expressed in whole numbers: thirty-one percent for promotion-1 132, twenty-seven percent for promotion-2 134, and fifty-two percent for promotion-3 136. This would increase the chance of an advertising campaign ending within the middle of a period of distribution and not achieving the desired distribution. Also, the larger the period, the more difficult it is to calculate the specific distribution sequence for a particular period.

Moreover, if the distribution percentages were more tailored to a specific objective, such as by not rounding up the percentages, the period would further increase. For example, in Segment-C 140, the lowest value for a period that exactly achieves the desired distribution is one-thousand samples, since the distribution is not expressed in whole numbers: 25.3% for promotion-1 132, 33.4% for promotion-2 134, and 41.3% for promotion-3 136. Again, by increasing the period, especially for small samples, the actual distribution has a higher chance of being off from the desired distribution. This problem is accentuated the more finely tuned or accurate the distribution percentages are.

Thus, the use of random allocation, naive round-robin, and general round-robin to achieve distributions close to desired distribution patterns are inadequate in environments where the amount of customers and the frequency of customers are unknown.

SUMMARY OF THE INVENTION

Accordingly, a method and system for providing deterministic sampling with a specific distribution is described. The present invention provides a method and system that can implement a desired distribution of tasks. The present invention provides the above accomplishment and can also provide for an actual distribution that most closely resembles a desired distribution at any point in time. The present invention provides the above accomplishment and can also provide for a method and system of task selection on a per customer basis. These and other objects and advantages of the present invention will no doubt become obvious to those of ordinary skill in the art after having read the following detailed description of the preferred embodiments which are illustrated in the various drawing figures.

Specifically, in one embodiment, the present invention discloses a method and system for selecting a task from a plurality of tasks. For example, the task is associated with a visiting customer to a web site over a communication network. The customer is assigned to a segment of a target customer base that most closely resembles the customer's characteristics. A plurality of tasks is associated with the segment and can be expressed as a distribution of tasks performed. A current distribution of tasks is determined. The task which provides a new distribution that is closest to a desired distribution of the plurality of tasks is selected to be performed. In one embodiment, the task to be performed is the offering of an advertising promotion to the customer over the communication network.

In another embodiment, the distribution of tasks for a particular segment can be expressed as a vector. As such, an actual or current distribution of tasks, a hypothetical distribution of tasks, and a desired distribution of tasks all can be expressed as a vector. The components of each of these vectors are associated with the tasks to be performed for that segment, one component for each of the tasks. Each component describes the number of times a task has been, in actuality or theoretically, performed. Each component is expressed as a percentage over the sum of all the tasks that has been, in actuality or theoretically, performed within that particular segment.

Since the distribution of tasks can be expressed as vectors, selection of a task to be performed within a segment can be determined through vector analysis. In one embodiment, a task is theoretically selected. A new distribution of tasks is calculated that assumes that task was performed and expressed in vector form. This new distribution is compared to the desired distribution of tasks as expressed in vector form to calculate a mathematical distance. The new distribution of tasks is subtracted from the desired distribution of tasks and the norm of the resulting vector is calculated to find the mathematical distance. In one embodiment, the means for calculating the vector norm is Euclidean.

This process is repeated for every possible task to be performed within that segment. This represents the various tasks that could theoretically be selected and results in a plurality of hypothetical distributions of tasks. A resulting vector is calculated from every hypothetical distribution of tasks that is compared to the desired distribution. The norm of each of the resulting vectors form a plurality of norms and represents the mathematical distances for each of the hypothetical distributions.

The distance that has the least value represents the best distribution of tasks that is closest to the desired distribution. That least distance, is associated with a task. Thus, selection of that task will also achieve a distribution of tasks closest to the desired distribution.

In one embodiment of the present invention, the hypothetical distributions can be pre-calculated before a customer visits a web site. In that way, web site can pre-select the task to be performed for a customer of a particular segment. Using this methodology of selecting tasks, any number of tasks can be pre-selected.

In another embodiment of the present invention, various means for calculating the norm of a vector can be used, such as Euclidean, Metropolitan, or taking the maximum absolute value of the components. Dynamic selection between the various methods for calculating the norm of a vector is implemented depending on the load conditions over the communication network that includes the web site selecting the task to be performed.

BRIEF DESCRIPTION OF THE DRAWINGS

PRIOR ART

FIG. 7A illustrates one method for calculating a norm of a vector in accordance with one embodiment of the present invention.

FIG. 7B illustrates one method for calculating a norm of a vector in accordance with one embodiment of the present invention.

FIG. 7C illustrates one method for calculating a norm of a vector in accordance with one embodiment of the present invention.

FIG. 7D illustrates one method for calculating a norm of a vector in accordance with one embodiment of the present invention.

DETAILED DESCRIPTION OF THE INVENTION

Figure 1:
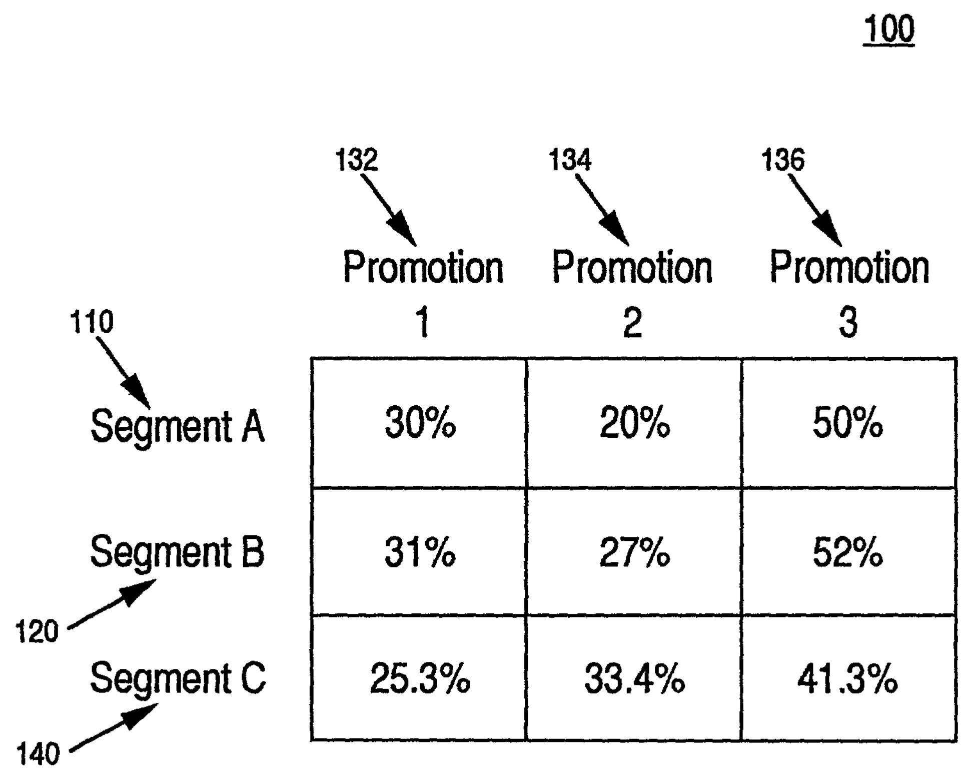
FIG. 1 illustrates a matrix table of an exemplary advertising campaign in the prior art.

Reference will now be made in detail to the preferred embodiments of the present invention, a method and system for deterministic sampling with a specific distribution, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Notation and Nomenclature

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as transactions bits, values, elements, symbols, characters, fragments, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing," or "computing," or "translating," or "calculating," or "determining," or "scrolling," or "displaying," or "recognizing," or the like, refer to the action and processes (e.g., processes 400 and 500 of FIGS. 4 and 5, respectively) of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission or display devices. The present invention is well suited to the use of other computer systems.

Figure 2:
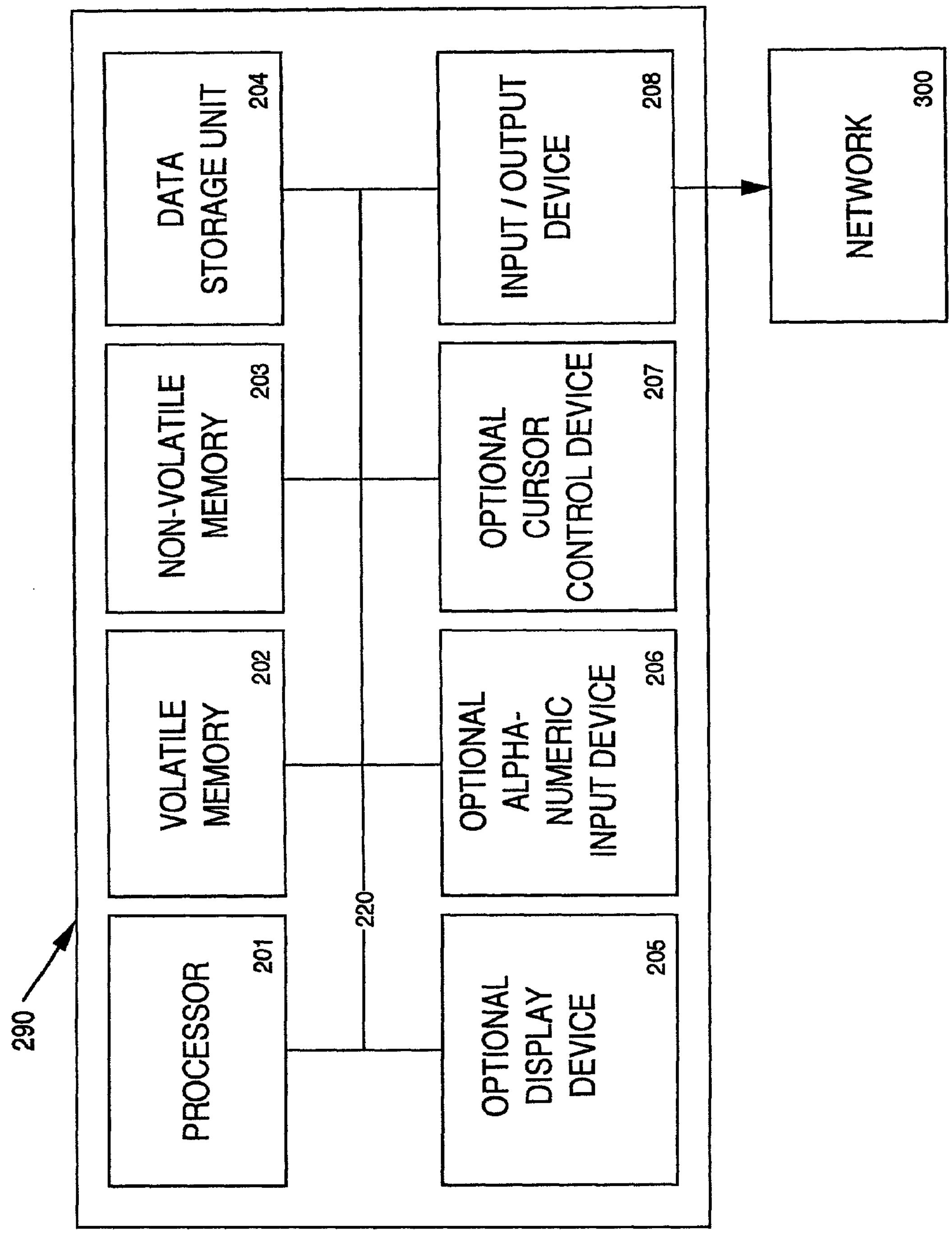
FIG. 2 is a logical block diagram of an exemplary computer system upon which embodiments of the present invention may be practiced.

Refer now to FIG. 2, which illustrates an exemplary computer system 290 upon which embodiments of the present invention may be practiced. In general computer system 290 comprises an address/data bus or other communication means 220 for communicating information, a central processor 201 coupled with the bus for processing information and instructions, a volatile memory 202 (e.g., random access memory (RAM), static RAM dynamic RAM, etc.) coupled with the bus 220 for storing information and instructions for the central processor 201, a non-volatile memory 203 (e.g., read only memory (ROM), programmable ROM, flash memory, EPROM, EEPROM, etc.) coupled with the bus 120 for storing static information and instructions for the processor 201, an optional data storage device 204 (e.g., memory card, hard drive, optical disk, etc.) coupled with the bus 220 for storing information and instructions, an optional user output device such as display device 205 coupled to the bus 220 for displaying information to the computer user, an optional user input device such as alphanumeric input device 206 including alphanumeric and function keys coupled to the bus 220 for communicating information and command selections to the central processor 201, and an optional user input device such as cursor control device 207 coupled to the bus 220 for communicating user input information and command selections to the central processor 201.

The display device 205 of FIG. 2 utilized with the computer system 190 of the present invention may be a liquid crystal device, cathode ray tube, or other display device suitable for creating graphic images and alphanumeric characters recognizable to the user. The cursor control device 207 allows the computer user to dynamically signal the two dimensional movement of a visible symbol (pointer) on a display screen of the display device 205. Many implementations of the cursor control device are known in the art including a trackball, mouse, joystick or special keys on the alphanumeric input device 206 capable of signaling movement of a given direction or manner of displacement. It is to be appreciated that the cursor means 207 also may be directed and/or activated via input from the keyboard using special keys and key sequence commands. Alternatively, the cursor may be directed and/or activated via input from a number of specially adapted cursor directing devices.

Computer system 290 also includes an input/output device 208, which is coupled to bus 220 for providing a physical communication link between computer system 290 and a network 300 (refer to FIG. 3, below). As such, Input/Output device 208 enables, central processor unit 201 to communication with other electronic systems coupled to network 300. It should be appreciated that within the present embodiment, input/output device 208 provides the functionality to transmit and receive information over a wired as well as a wireless communication interface (such as an IEEE 802.11b interface). It should be further appreciated that the present embodiment of input/output device 208 is well suited to be implemented in a wide variety of ways. For example, input/output device 208 could be implemented as a modem.

Figure 3:
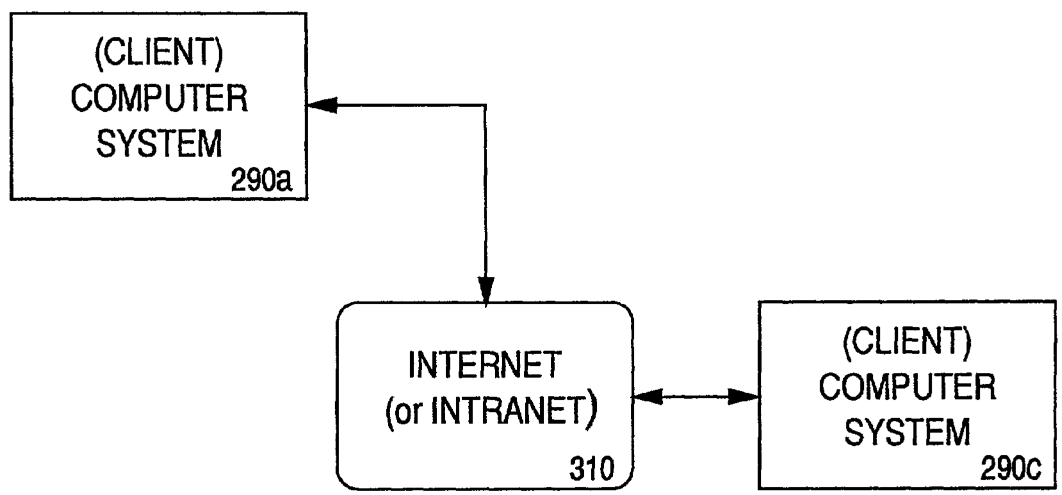
FIG. 3 is a data flow diagram illustrating a method for classifying an information record in accordance with one embodiment of the present invention.

FIG. 3 is a block diagram of computer system 290*a* and 290*c* coupled in an exemplary network 300 upon which embodiments of the present invention can be implemented. The computer systems 290*a* and 290*c* may be physically in separate locations (e.g., remotely separated from each other). It is appreciated that the present invention can be utilized with any number of computer systems.

Network 300 may represent a portion of a communication network located within a firewall of an organization or corporation (an "Intranet"), or network 300 may represent a portion of the World Wide Web or Internet 210. The mechanisms for coupling computer systems 290*a* and 290*c* over the Internet (or Intranet) 210 are well known in the art. In the present embodiment, standard Internet protocols like IP (Internet Protocol), TCP (Transmission Control Protocol), HTTP (Hyper Text Transfer Protocol), and SSL (Secure Socket Layer) are used to transport data between clients and servers, in either direction. However, the coupling of computer systems 190*a* and 190*c* can be accomplished over any network protocol that supports a network connection including NetBIOS, IPX (Internet Packet Exchange), and LU6.2, and link layers protocols such as Ethernet, token ring, and ATM (Asynchronous Transfer Mode). Computer systems 190*a* and 190*c* may also be coupled via their respective Input/Output ports (e.g., serial ports) or via wireless connections (e.g., according to IEEE 802.11b).

Deterministic Sampling with a Specific Distribution

Accordingly, a method and system for providing deterministic sampling with a specific distribution is described. The present invention provides a method and system that can implement a desired distribution of tasks. The present invention provides the above accomplishment and can also provide for an actual distribution that most closely resembles a desired distribution at any point in time. The present invention provides the above accomplishment and can also provide for a method and system of task selection on a per customer basis.

While the present invention is described in an environment where an advertising campaign is offered to customers visiting a web site over a communication network such as the Internet, it is appreciated that the present invention can be utilized in any data driven environment where a task, operation is performed, or a selection is made in response to an event.

Examples of environments or situations where selection of a task is necessary include on-line advertising campaigns, load balancing, routing of service requests, distribution of customers at the department of motor vehicles, as well as others. In a load balancing environment, based on the ratio of throughput of different servers, tasks have to be routed to each of the servers in different proportions to allow for load balancing without feedback. For the routing of service requests (e-services, print jobs, etc.), service requests are dynamically routed to service providers in order to honor contractually agreed upon proportions.

In particular, for on-line advertising campaigns over an Internet communication network, customers arrive sequentially at a web site. However, the number of arrivals remains uncertain and the frequency of arrivals or visitations remain uncertain making task selection difficult. Upon customer arrival, actual or theoretical, the system chooses a task to be performed. In an advertising campaign, the task to be performed can be an offer to the customer of an advertising promotion. Other tasks include offering rebates, or coupons, etc.

Selection of the task by embodiments of the present invention is done in such a way to realize desired distributions of the tasks for a given segment of a customer base for the advertising campaign. A desired distribution of tasks is created to achieve a particular objective, such as, maximizing profit, generating revenue, reducing inventory, generating new customers, etc.

Figure 4:
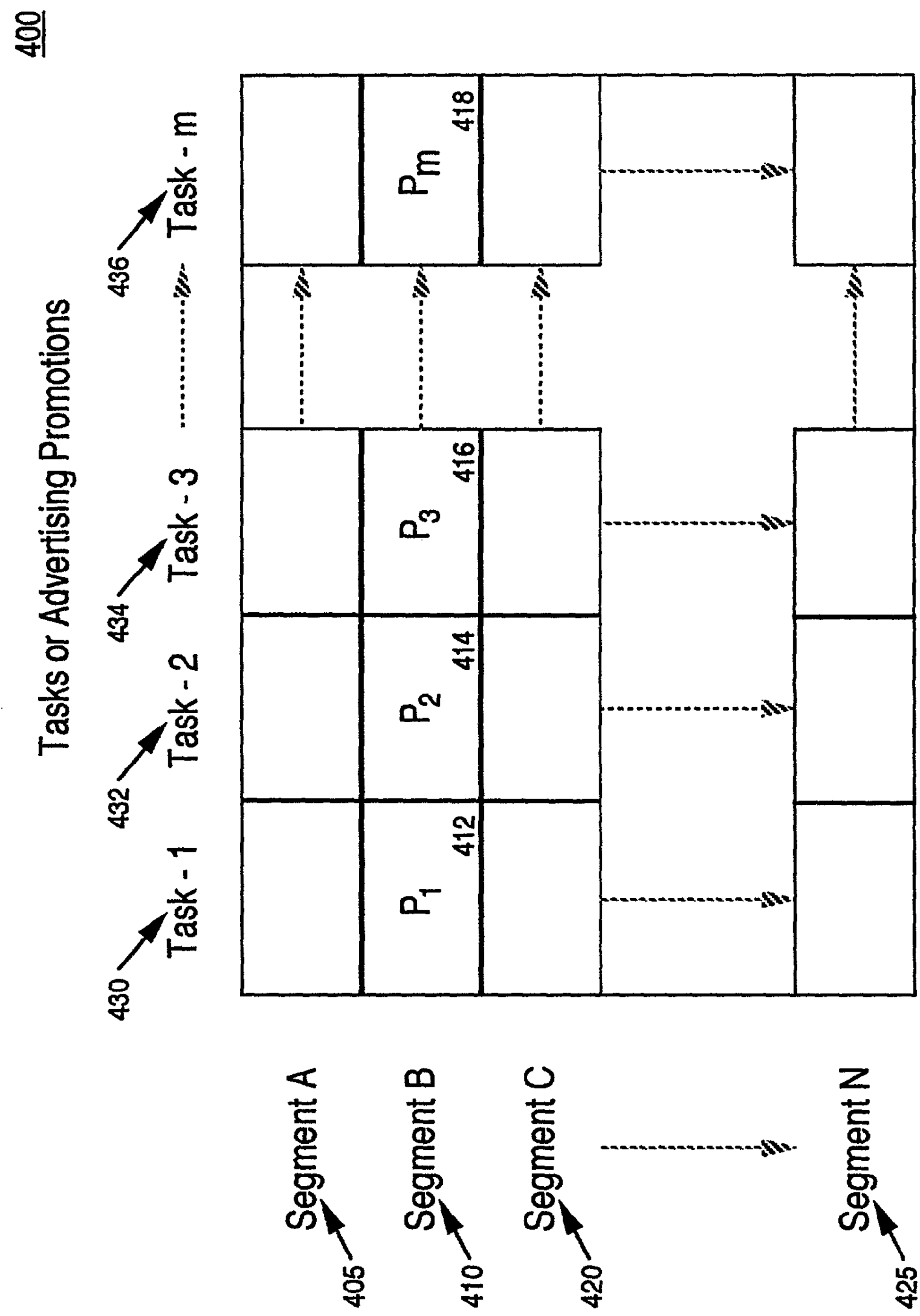
FIG. 4 is an illustration showing an exemplary matrix table of an advertising campaign in accordance with one embodiment of the present invention.

FIG. 4 illustrates an exemplary matrix table 400 of an advertising campaign. The advertising campaign has a target customer base to which advertising promotions are offered. The target customer base can be further divided into segments, where each of the segments describe an independent set of customer characteristics. In table 400, the advertising campaign has N-segments: segment-A 405, segment-B 410, segment-C 420, on up to segment-N 425.

Tasks are associated with each of the segments. In the advertising campaign described in table 400, the various tasks are as follows: task-1 430, task-2 432, task-3 434, on up to task-n 436. For example, task-1 can be an ad banner for black running shoes, task-2 can be an ad banner for white basketball shoes, etc.

In one embodiment of the present invention, a software module allocates tasks to customers of a segment in pre-specified proportions in a sequential fashion. In other words, for each of the segments in table 400, distribution of the tasks are tailored to achieve particular objectives specific to that segment, or global objectives specific to a campaign. This distribution can be expressed in a vector format for each of the segments of table 400. The optimal proportions in which the tasks are allocated are given as vector-p as follows:

$$\overline{p} = (p_1, p_2, \ldots, p_m), \sum_i p_1 = 1, p_i \geq 0.$$

For example, FIG. 4 illustrates an exemplary desired distribution of tasks for segment B 410. The components of vector-p are as follows: $p_1$ in box 412 as representative of the proportions as optimally performed for task-1 430, $p_1$ in box 412 as representative of the proportions as optimally performed for task-1 430, $p_2$ in box 414 as representative of the proportions as optimally performed for task-2 432, $p_3$ in box 416 as representative of the proportions as optimally performed for task-3 434, and $p_m$ in box 418 as representative of the proportions as optimally performed for task-m 436.

The actual distribution of tasks for a given segment can also be expressed as a vector. It is defined that $q_k=(q_{k1}, q_{k2}, \ldots, q_{km})$ is the vector of proportions achieved after the $k^{th}$ arrival. If $n_i$, where $i=1, 2, \ldots, m$, is the number of allocations of task i after $k>0$ arrivals, then the component values for vector-q is expressed as follows:

$$q_{ki} = \frac{n}{\sum_i n_i}.$$

Selection of tasks for a sequence of events, or arrivals in the above case, is determined by the following rules:

Rule 1:

For the first event of a sequence of events, or the first arrival, allocate task i* for which $p_i$ is maximal, i.e., where $i^*=\arg\max_i \{p_i\}$; and Rule 2:

For any subsequent event of a sequence of events, or any subsequent arrival k, allocate task $j^*_k$ such that the distance of vector-$q_k$ and vector-p is minimized, i.e.

$$\begin{aligned} j_k^* &= \mathrm{argmin}_j \left\{ \left\| \left( q_{k1}, \ldots, q_{k,j-1}, \left( \sum_i n_i \right)^{-1} (n_j+1), q_{k,j+1}, \ldots, q_{km} \right) - \overline{p} \right\| \right\} \\ &= \mathrm{argmin}_j \left\{ \left\| \left( q_{k1}, \ldots, q_{k,j-1}, q_{k,j} + \left( \sum_i n_i \right)^{-1}, q_{k,j+1}, \ldots, q_{km} \right) - \overline{p} \right\| \right\} \end{aligned}$$

Since i* or j* may not be unique, any minimizer could be implemented for task selection among the remaining tasks (e.g., random, smallest, biggest, etc.).

Assuming the selection of a task follows the task recommended ($j^*_k$) by the equations outlined above, the index of the next task to be offered can be pre-computed. In one embodiment, the next task is pre-computed as soon as the previous arrival is received, thus a task is pre-selected one-step ahead before the arrival of that customer. In another embodiment, the sequence of tasks to be offered can be pre-computed in batch mode to speed up the real time delivery or performance of tasks.

Figure 5:
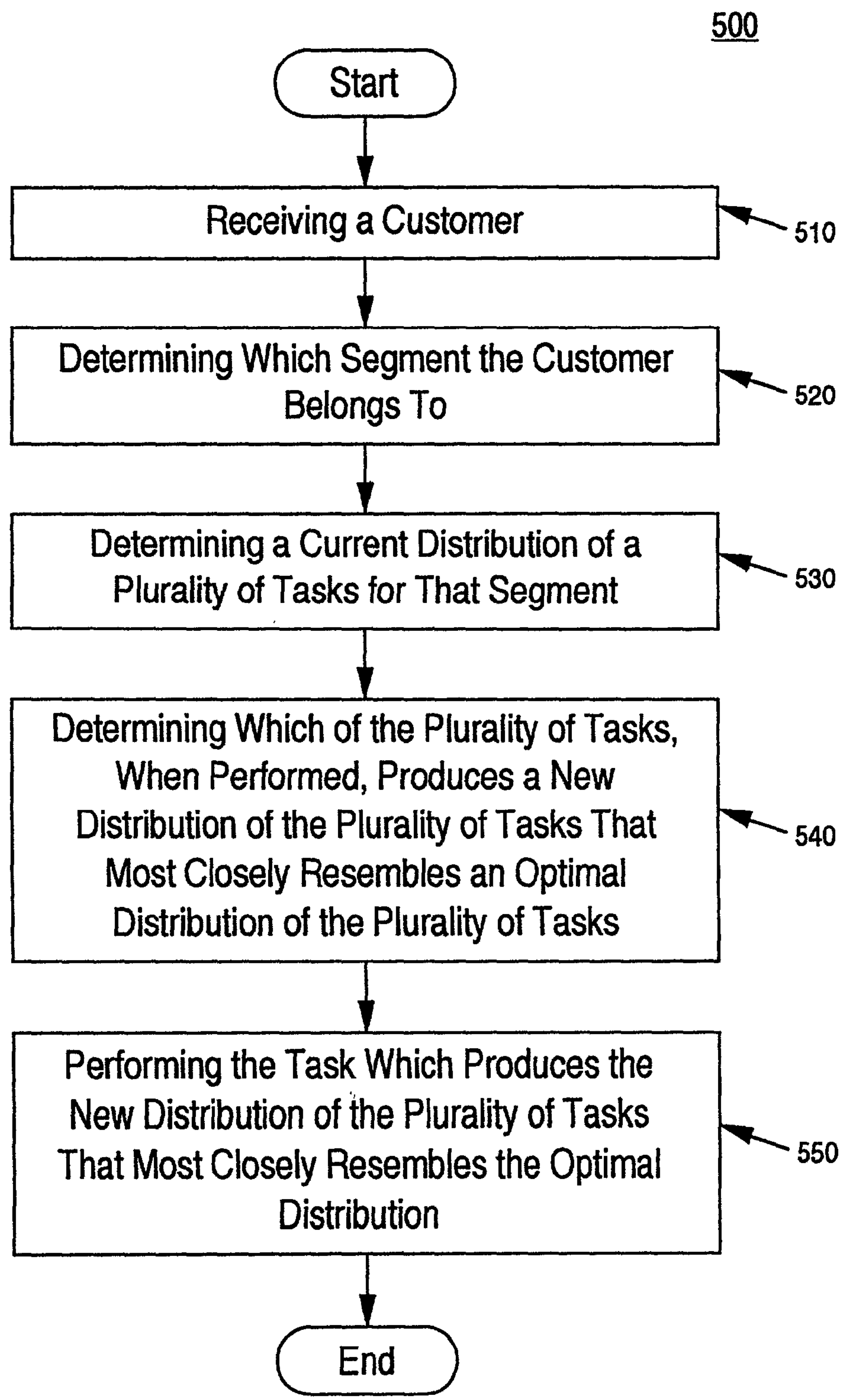
FIG. 5 is a flow diagram illustrating steps in a computer implemented method for task selection within a segment in accordance with one embodiment of the present invention.

FIG. 5 illustrates a flow chart of steps in accordance with the process 500 used for task selection in response to the arrival of a customer at a web site, in accordance with one embodiment of the present invention. For example, an advertising campaign uses the process 500 for task selection. Process 500 begins with step 510, where a customer is received at a web site.

It is appreciated that process 500 in FIG. 5 can be utilized in any data driven environment where task selection is necessary in response to an event. In the above example, the event described is a visit by a customer to a web site over a communication network, such as the Internet.

In step 520 of process 500, a segment of the target customer base is determined that most closely matches the characteristics of the customer. The customer base is defined as all the customers targeted by the advertising campaign.

In step 530 of process 500, a current distribution of a plurality of tasks for the segment to which the customer belongs is calculated.

In step 540 of process 500, it is determined which of the plurality of tasks, assuming that task was performed, produces a new distribution of the plurality of tasks that most closely resembles the desired distribution of the plurality of tasks. This desired distribution is also previously described as the vector-p.

In step 540, process 500 examines each of the tasks available for that segment and calculates a hypothetical distribution of tasks that theoretically assumes that task was performed. This hypothetical distribution is calculated for each task, and forms a plurality of hypothetical distributions. Each of the plurality of hypothetical distributions are examined to determine which distribution most closely resembles the desired distribution of tasks.

In step 550, the task associated with the hypothetical distribution of tasks that most closely resembles the desired distribution is selected and performed.

In another embodiment, in step 550, if the customer is the first customer in a sequence, the task selected is the task that has the highest proportionate value in the desired distribution of tasks. In other words, the task that is selected has the highest component value in vector-p for that segment and will be performed more often than any other task for that segment in a sequence of customers.

Figure 6:
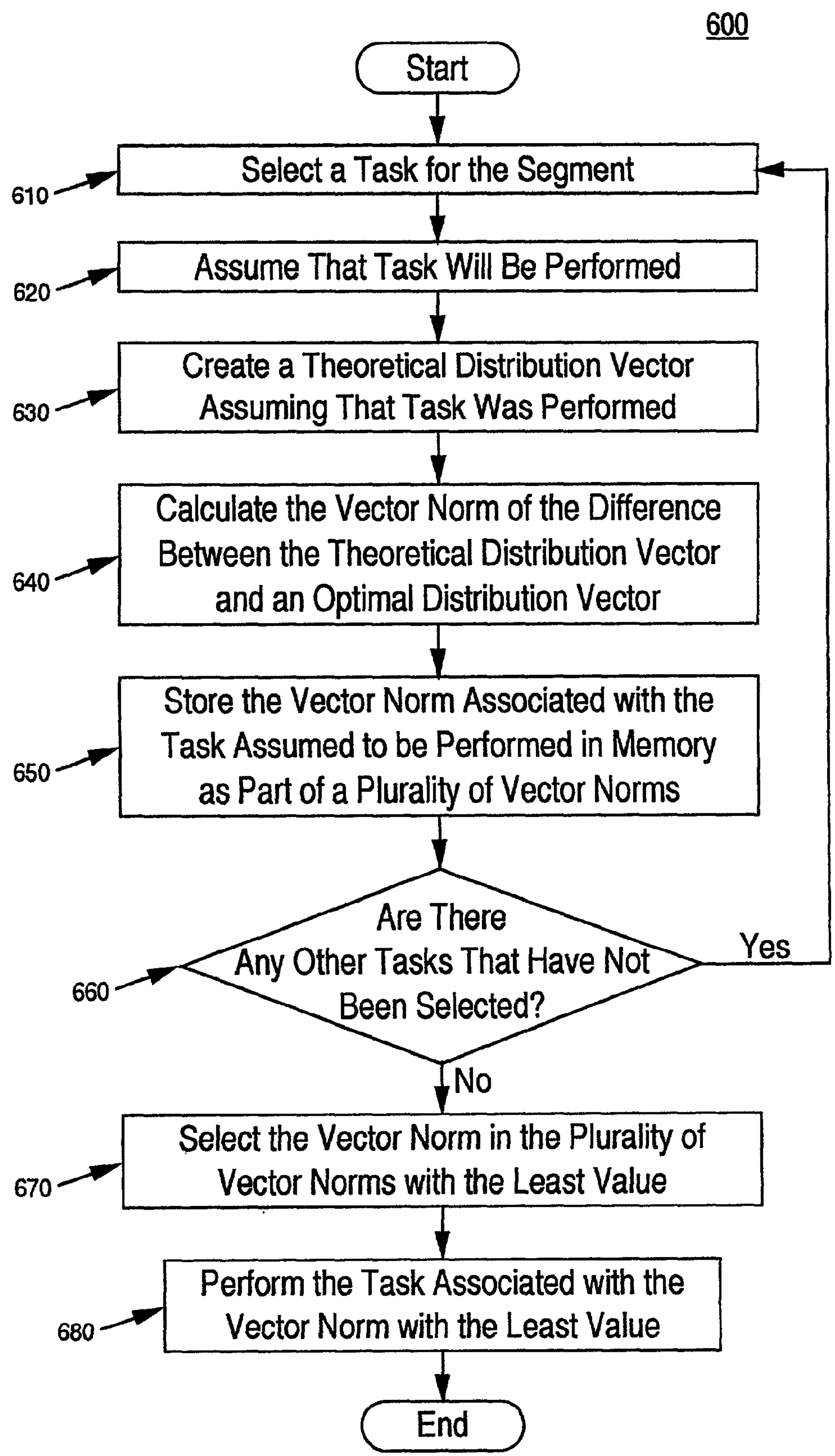
FIG. 6 is a flow diagram illustrating steps in a computer implemented method for calculating the distance between hypothetical distributions and a desired distribution for selecting the task that provides the distribution of tasks closest to the desired distribution, in accordance with one embodiment of the present invention.

FIG. 6 illustrates a flow chart of steps in accordance with the process 600 used for task selection in response to the arrival of a customer at a web site. Process 600 selects the task that produces a minimal distance when comparing the hypothetical distributions to the desired distribution for a particular segment, in accordance with one embodiment of the present invention. Process 600 can be implemented at step 540 of process 500.

Process 600 begins with step 610, where a task is selected in the segment of interest. For example, in the example outlined in FIG. 5, the segment of interest pertains to the segment that most closely matches the characteristics of a customer visiting a web site.

In step 620 of process 600, it is theoretically assumed that the task will be performed. This is so that a hypothetical distribution of tasks can be calculated in step 630. Also, this hypothetical distribution of tasks is expressed in vector form.

In step 640, the hypothetical distribution of tasks is compared to the desired distribution of tasks. Since the hypothetical distribution and the desired distribution of tasks are expressed in vector form, a mathematical distance can be calculated. The mathematical distance is calculated by taking the norm of a resulting vector created by taking the difference between the hypothetical distribution and the desired distribution vectors.

This norm of the resulting difference vector is then stored in memory in step 650 of process 600. This stored norm is part of a plurality of norms that are also stored in memory. Each of the plurality of norms is associated with a resulting difference vector that assumes one of the plurality of tasks for that segment was selected.

In step 660 of process 600, if there remains another task in the segment for which a hypothetical distribution has not been created, as well as a corresponding norm of the resulting difference vector, then process 600 returns to step 610. On the other hand, if norms have been calculated for all the tasks in that segment, by assuming each of those tasks were theoretically selected to be performed, then process 600 proceeds to step 670.

In step 670 of process 600, the norm which has the least value as compared to all the norms in the plurality of norms is selected. This selected norm is associated with a task in computing a hypothetical distribution and a resulting difference vector, as outlined above. In step 680, the associated task is selected to be performed in the proper sequence of the sequence of tasks.

Figure 7D:
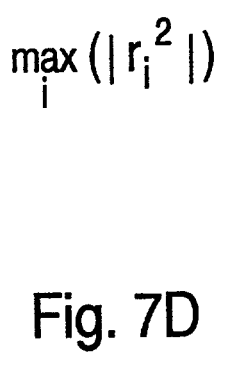

Calculation of the norm in process 600 determines a mathematical distance of the resulting difference vector between the theoretical and desired distribution vectors. It is appreciated that many different calculations of vector norms can be used in process 600, in accordance with one embodiment of the present invention. FIGS. 7A, 7B, 7C, and 7D provide a few of the various means for calculating a norm of a vector. The equation in FIG. 7A illustrates the Metropolitan method for calculating the norm of a vector. The equation in FIG. 7B illustrates the unscaled dot-product (Euclidean) method for calculating the norm of a vector. The equation in FIG. 7C illustrates the generalized (p-norm) method for calculating the norm of a vector. The equation in FIG. 7D illustrates the maximum norm method for calculating the norm of a vector, where the maximum of the absolute value of the components of the vector is used.

Embodiments of the present invention, as described above and in processes 500 and 600 provide for selection of a task, independent from the number of arrivals that prompt task selection, where the realized proportions of task distribution are the closest possible to the desired proportions of task distribution with respect to the distance defined by the norm of a vector.

While the methods of embodiments illustrated in processes 500 and 600 show specific sequences and quantity of steps, the present invention is suitable to alternative embodiments. For example, not all the steps provided for in the method are required for the present invention. Furthermore, additional steps can be added to the steps presented in the present embodiment. Likewise, the sequences of steps can be modified depending upon the application.

The instructions for the steps, and the data input and output from the steps of process 500 and 600 may be implemented utilizing processor 201, RAM memory 202, and ROM memory 203, as shown in FIG. 2. Furthermore, other types of memory storage can be utilized to accomplish the aforementioned such as a hard drive, a CD ROM, flash memory, or any compact integrated circuit memory storage device.

The preferred embodiment of the present invention, a method and system for providing deterministic sampling with a specific distribution, is thus described. While the present invention has been described in particular embodiments, it should be appreciated that the present invention should not be construed as limited by such embodiments, but rather construed according to the below claims.

What is claimed is:

1. A method of task selection comprising:

determining a specified distribution of a plurality of tasks, wherein said specified distribution of said plurality of tasks is represented as a first vector;

assuming a first event in a sequence of events occurs, each event in said sequence of events triggering execution of one of said plurality of tasks;

determining, by a system including a processor, a plurality of hypothetical distributions of said plurality of tasks for respective tasks hypothetically selected for execution from said plurality of tasks, wherein said hypothetic distributions are represented as corresponding second vectors; and selecting, by the system, a first task for execution from said plurality of tasks, which when selected provides a corresponding hypothetical distribution of said plurality of tasks that is closest to said specified distribution of said plurality of tasks for implementation of said specified distribution, wherein the selecting of said first task is based on computing distances between the first vector and the respective second vectors.

2. The method of claim 1, wherein further comprising performing said first task when said first event in said sequence of events actually occurs.

3. The method of claim 1, wherein said first event is a customer visiting a web site over a communication network, and said sequence of events is a sequence of customers visiting said web site.

4. The method of claim 3, wherein said plurality of tasks include a plurality of advertising promotions that individually, when selected by said method, is offered to each customer in said sequence of customers.

5. The method of claim 1, wherein each of the second vectors comprises a plurality of components, said plurality of components associated with said plurality of tasks where each of said plurality of components is associated with a corresponding task in said plurality of tasks, each of said plurality of components defining a number of times the corresponding task has been selected within said sequence of events in relation to a sum of all tasks selected within said sequence of events prior to said first event.

6. The method of claim 1, wherein the computed distances include mathematical distances, each of the mathematical distances calculated by taking a difference between the first vector and a corresponding one of the second vectors, the method further comprising:

selecting a first mathematical distance from said mathematical distances that has the least value, said first mathematical distance associated with the selection of said first task in association with said first event.

7. The method of claim 6, wherein said plurality of hypothetical distributions are pre-calculated before said first event occurs.

8. The method of claim 6, wherein each of said mathematical distances is a vector norm calculated from a vector difference between the first vector and a corresponding one of the second vectors.

9. The method of claim 3, wherein each of said events in said sequence of events is classified within a segment, said segment defining an independent set of characteristics, said segment associated with said plurality of tasks.

10. The method of claim 1, wherein if said first event is the first in said sequence of events, then said first task has a highest proportionate value in said specified distribution of said plurality of tasks.

11. A computer system comprising:

at least one processor to:

determine a specified distribution of a plurality of tasks, wherein said specified distribution of said plurality of tasks is represented as a first vector;

trigger execution of one of said plurality of tasks if a first event in a sequence of events occurs;

determine a plurality of hypothetical distributions of said plurality of tasks for respective tasks hypothetically selected for execution from said plurality of tasks, wherein said hypothetic distributions are represented as corresponding second vectors;

select a first task for execution from said plurality of tasks, which when selected provides a corresponding hypothetical distribution of said plurality of tasks that is closest to said specified distribution of said plurality of tasks for implementation of said specified distribution, wherein the selecting of said first task is based on computing distances between the first vector and the respective second vectors.

12. The computer system of claim 11, wherein the at least one processor is to cause performance of said first task when said first event in said sequence of events actually occurs.

13. The computer system of claim 11, wherein said first event is a customer visiting a web site over a communication network, and said sequence of events is a sequence of customers visiting said web site.

14. The computer system of claim 13, wherein said plurality of tasks include a plurality of advertising promotions that individually, when selected, is offered to each customer in said sequence of customers.

15. The computer system of claim 11, wherein each of the second vectors comprises a plurality of components, said plurality of components associated with said plurality of tasks where each of said plurality of components is associated with a corresponding task in said plurality of tasks, each of said plurality of components defining a number of times the corresponding task has been selected within said sequence of events in relation to a sum of all tasks selected within said sequence of events prior to said first event.

16. The computer system of claim 11, wherein the computed distances include mathematical distances, each of the mathematical distances calculated by taking a difference between the first vector and a corresponding one of the second vectors, the at least one processor to further:

select a first mathematical distance from said mathematical distances that has the least value, said first mathematical distance associated with the selection of said first task in association with said first event.

17. The computer system of claim 16, wherein said plurality of hypothetical distributions are pre-calculated before said first event occurs.

18. The computer system of claim 16, wherein each of said mathematical distances is a vector norm calculated from a vector difference between the first vector and a corresponding one of the second vectors.

19. The computer system of claim 11, wherein an objective of selecting said first task is to enhance profitability.

20. The computer system of claim 11, wherein if said first event is the first in said sequence of events, then said first task has a highest proportionate value in said specified distribution of said plurality of tasks.

21. The computer system of claim 11, wherein each of said events in said sequence of events is classified within a segment, said segment defining an independent set of characteristics, said segment associated with said plurality of tasks.

22. A non-transitory computer-readable storage medium storing instructions that upon execution cause a system to:

determine a specified distribution of a plurality of tasks, wherein said specified distribution of said plurality of tasks is represented as a first vector;

trigger execution of one of said plurality of tasks if a first event in a sequence of events occurs;

determine a plurality of hypothetical distributions of said plurality of tasks for respective tasks hypothetically selected for execution from said plurality of tasks, wherein said hypothetic distributions are represented as corresponding second vectors;

select a first task for execution from said plurality of tasks, which when selected provides a corresponding hypothetical distribution of said plurality of tasks that is closest to said specified distribution of said plurality of tasks, wherein the selecting of said first task is based on computing distances between the first vector and the respective second vectors.

* * * * *